United States Patent
Van Patten

[15] 3,672,219
[45] June 27, 1972

[54] ADJUSTABLE HYDRAULIC/ELECTRIC HAND GRIP DYNAMOMETER

[72] Inventor: Robert E. Van Patten, Dayton, Ohio

[73] Assignee: The United States of America as represented by the Secretary of the Air Force

[22] Filed: Nov. 12, 1970

[21] Appl. No.: 88,760

[52] U.S. Cl.................................................73/379, 272/68
[51] Int. Cl. .......................................................G01l 5/02
[58] Field of Search ................73/379, 380, 381; 272/67, 68

[56] References Cited

UNITED STATES PATENTS

| 468,154 | 2/1892 | McClure | 73/380 |
| 3,442,132 | 5/1969 | De Mare | 73/379 |

Primary Examiner—Richard C. Queisser
Assistant Examiner—Arthur E. Korkosz
Attorney—Harry A. Herbert, Jr. and Arthur R. Parker

[57] ABSTRACT

A hand-grip dynamometer having a main support element mounting front and back grip members in spaced relation on opposite sides thereof, and incorporating a hydraulic system interconnected with the front grip member and combined with a potentiometric pressure transducer for measuring a gripping force applied to the front grip member.

8 Claims, 19 Drawing Figures

PATENTED JUN 27 1972 3,672,219
SHEET 1 OF 4
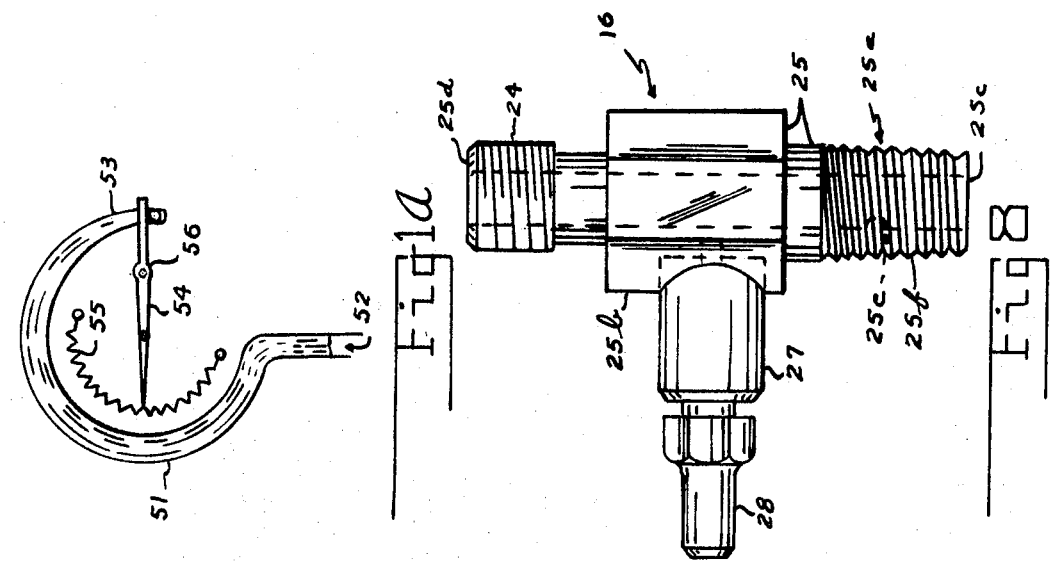
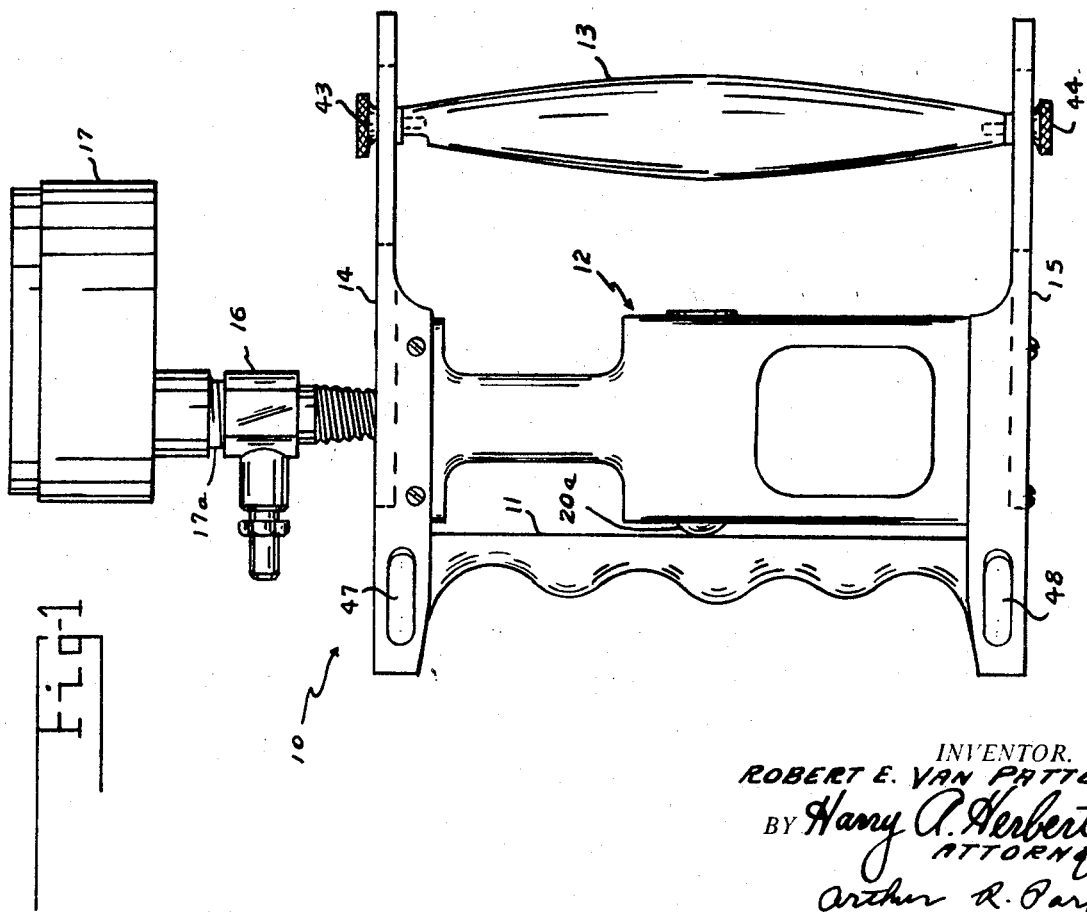
INVENTOR.
ROBERT E. VAN PATTEN
BY Harry A. Herbert Jr
ATTORNEY
Arthur R. Parker
AGENT

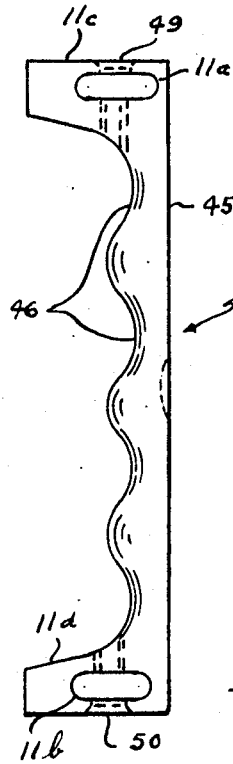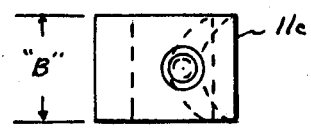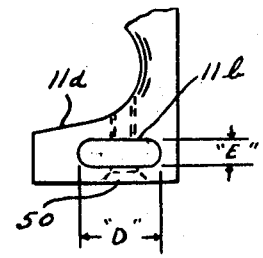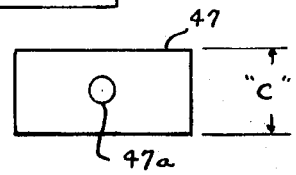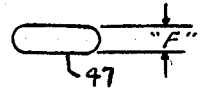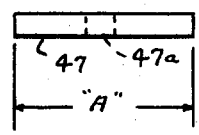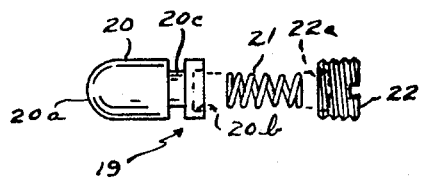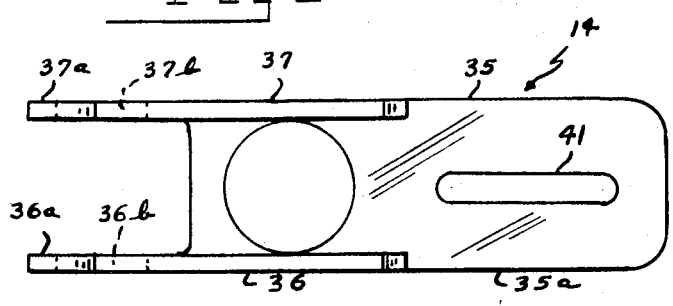

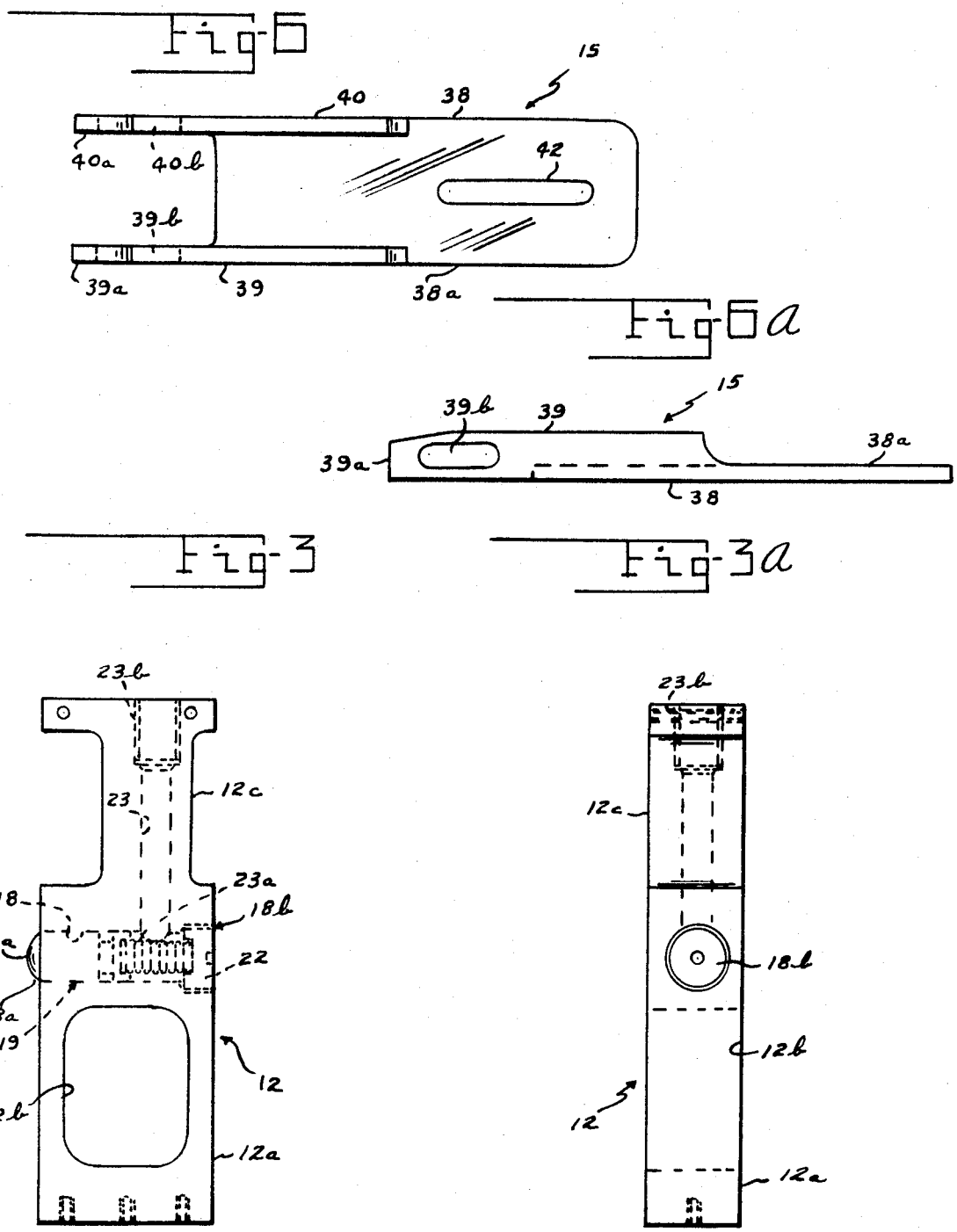

PATENTED JUN 27 1972 3,672,219

INVENTOR.
ROBERT E. VAN PATTEN
BY Harry A. Herbert Jr
ATTORNEY
Arthur R. Parker
AGENT 3,672,219

ADJUSTABLE HYDRAULIC/ELECTRIC HAND GRIP DYNAMOMETER

BACKGROUND OF THE INVENTION

This invention relates generally to the field of technology involving the measurement of the gripping strength of the human hand by the use of a dynamometer device.

Previously developed hand-grip dynamometers used for measuring the strength of the human hand have generally been divided into either the mechanical, or strain gage type. The mechanical-type units in current use have been prone or subject to pivot friction and excessive wear resulting in both the disadvantages of hysteresis and in the development of progressive inaccuracies. The strain gage-type of hand-grip dynamometer suffers from the disadvantage of excessive weight due to its incorporation of a relatively heavy beam cross-section being utilized as the strain member. The latter must be made large enough to obviate any damage from bending and creep effects. Moreover, such strain gage-type units also require relatively sophisticated signal conditioning and amplifying systems, usually of the carrier amplifier type. Finally, the common (elliptical) force ring type units are not adjustable to different hand sizes and, therefore, with this type hand-strength measurements are of doubtful validity. The foregoing problems have been substantially eliminated by the unique and yet simplified hand-grip device of the present invention, as will become readily apparent hereinafter in the following summary and detailed description thereof.

SUMMARY OF THE INVENTION

The novel device of the present invention, which consists briefly of a simple, lightweight dynamometer for measuring the gripping strength of the human hand, includes a contoured front grip member and a double radiused back grip member held in the hand of the person to be tested with the fingers engaging the front grip member. A central support for retaining said front and back grip members in spaced-apart relation also incorporates a pressure-transferring system that includes a piston actuated by the grip of the human hand, which piston is positioned immediately behind the front grip member, and acts on a column of hydraulic oil in a cylinder that is in communication with a pressure transducer for measuring the gripping force applied by the subject to the said front grip member.

Certain advantages, as well as objects of the invention, will appear from the following detailed disclosure thereof, taken in connection with the accompanying drawings, in which:

SUMMARY OF THE DRAWINGS

FIG. 1 is an overall assembly view of the improved hand-grip dynamometer device of the present invention;

FIG. 1a illustrates a schematic view, showing further details of the potentiometric pressure transducer used with the invention;

FIG. 2 illustrates further details of the front grip member used with the device of FIG. 1;

FIG. 2a is a fragmentary, partly broken-away and detailed view, of one end portion of the front grip member of FIG. 2;

FIG. 2b represents a view of one end of the front grip member of FIG. 2, illustrating dimensional details of a preferred design of the invention;

FIGS. 2c, 2d, and 2e illustrate top, end, and front views, respectively, of one of the pair of the unique guide blocks utilized to assemble the front grip member of FIG. 2 to the overall inventive device of FIG. 1;

FIGS. 3 and 3a, respectively, illustrate plan and right-side views (as viewed in FIG. 1), showing further details of the novel cylinder assembly of the invention;

FIG. 4 depicts a disassembled view of the combined piston and spring assembly used with the cylinder assembly of FIGS. 3 and 3a;

FIGS. 5 and 6 respectively represent plan views, showing additional details of the upper and lower brackets used to retain both the front and back grip members and the cylinder assembly of the inventive device in their assembled condition to each other;

FIG. 6a is a side elevational view of the lower bracket of FIG. 6, illustrating further details of the forward or front end portion thereof that is utilized for unique interconnection with or attachment to, the front grip member of FIG. 2;

FIG. 8 illustrates an overall assembly view of the combined bleeder-connector assembly used with, and as part of, the present invention;

DESCRIPTION OF THE PREFERRED EMBODIMENT

Figure 7:
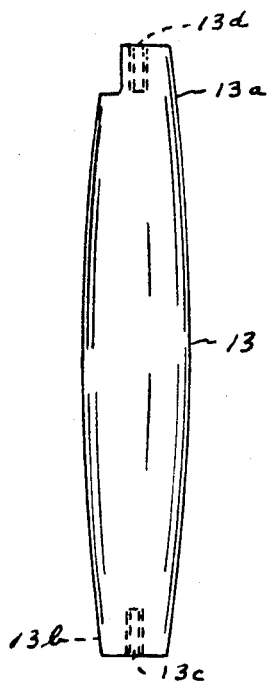
FIG. 7 represents a detailed view of the back grip member of the inventive device of FIG. 1.

Referring generally to the drawings and, in particular, to FIG. 1 thereof, the improved hand-grip dynamometer device of the present invention is indicated generally at 10 as consisting principally of a front grip member 11, a force or pressure-transmitting cylinder assembly 12, a back grip member 13, upper and lower brackets at 14 and 15 for retaining said front and back grip members 11, 13 and the cylinder assembly 12 in assembled relation to each other, a combined bleeder-connector assembly 16 and a transducer at 17. The cylinder assembly 12 is illustrated more clearly in FIGS. 3 and 3a as consisting of a lower, relatively enlarged-diameter body section 12a having a cutout portion at 12b to lighten the overall cylinder assembly weight, and an upper, relatively narrow-diameter body section 12c. An open-ended, transversely extending passage, constituting the cylinder bore, is incorporated within said cylinder 12, as is indicated generally at the reference numeral 18. Since it is open-ended, the said cylinder bore 18 extends entirely through the cylinder walls from a left-hand (as viewed in the aforesaid FIG. 3) bore opening 18a to a right-hand bore opening 18b.

Slidably positioned within the above-referred to cylinder bore 18 is the combined piston and spring assembly, indicated generally at 19 in the aforementioned FIG. 3 and in more detail in the disassembled view of FIG. 4. Said piston and spring assembly 19 consists of a piston at 20, a return spring 21 and a filler plug element at 22 which is threadedly engaged with, and closes the rear end or right-hand bore opening 18b, as is seen in FIG. 3. Said piston 20 incorporates a nose portion 20a which projects outwardly of the left-hand bore opening 18a approximately one-sixteenth inch for normal, resilient and continual contact with the rear of the front grip member 11 as is generally seen in FIG. 1. The piston 20 may preferably be generally circular in form and the nose end portion 20a thereof may incorporate a spherical radius configuration as is depicted in FIG. 4. To capture or retain opposite end portions of the return spring 21 in its appropriate and operative position, both the piston 20 and the filler plug element 22 may be provided with a recessed portion, indicated in FIG. 4 at 20b and 22a, respectively, which recessed portions 20b, 22a positively hold the return spring 21 in its correct position, when the piston and spring assembly 19 is assembled within the cylinder assembly 12, as in FIG. 1.

Cylinder assembly 12 further incorporates a first, hydraulic oil-filled passage at 23, which passage 23 is in open communication with the cylinder bore 18 and extends at right angles thereto, as is seen in the aforesaid FIG. 3. To seal the piston 20 to the cylinder bore 18 and thereby prevent leakage of hydraulic fluid from the bore opening 18a, an appropriate ⅜-inch O-ring seal (not shown) may be used in the reduced circumference portion of the piston 20 indicated at 20c in FIG. 4.

The point of open communication with the said cylinder bore 18 is indicated by the reference numeral at 23a. Thus, any motion of the piston 20 in the cylinder bore 18 by the application of a gripping force to the front grip member 11 will automatically act on or against, and thereby significantly increase the pressure in the hydraulic fluid in the said bore 18, as well as that in the first passage 23.

As seen generally in FIG. 8, the previously mentioned bleeder-connector assembly 16 consists principally of a main, bleeder-connector body, indicated generally at 25 (note, also FIG. 9), a bleeder housing 27 attached to said main bleeder connector body 25, and a bleeder screw at 28. The bleeder-connector body 25 includes a connector body portion 25a, and a bleeder body portion 25b (Note FIG. 9) that may be integrally formed in surrounding relation on the outer circumference of a portion of said connector body portion 25a intermediate its opposite open end portions at 25c and 25d. Connector body portion 25a incorporates a second, hydraulic-oil filled and longitudinally extending passage at 25e, which passage 25e is maintained in open communication with the first, hydraulic oil-filled passage 23 formed in the cylinder assembly 12, as previously described, when said bleeder-connector body 25 is attached to said cylinder assembly 12. For this purpose, one end of said cylinder assembly 12 and said first passage 23 incorporates an enlarged opening portion at 23b, which opening portion 23b may be internally threaded for threaded engagement with an externally threaded end portion 24 formed on one end portion of said connector body portion 25a.

Figure 9:
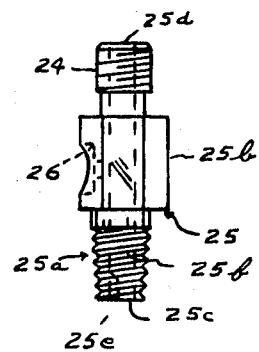
FIG. 9 depicts a longitudinal view of the bleeder-connector body portion used with the overall bleeder-connector assembly of FIG. 8.
Figure 11:
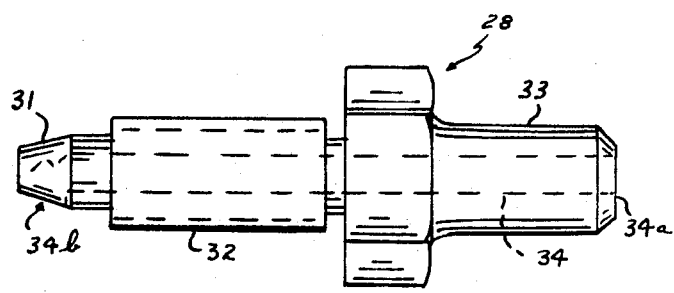
FIG. 11 is an enlarged view of the bleeder screw used with the bleeder housing of FIG. 11.
Figure 10:
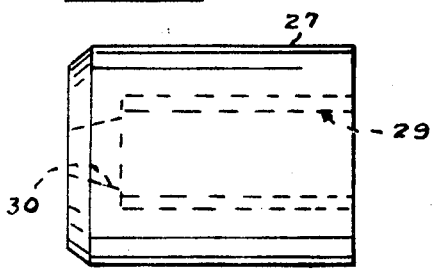
FIG. 10 represents an enlarged longitudinal view, illustrating additional details of the bleeder housing portion of the bleeder-connector assembly of FIG. 8.

The above-mentioned bleeder body portion 25b may be made with a counterbored portion as is illustrated at the reference numeral 26 in FIG. 9, for the purpose of receiving one end of the bleeder housing 27, shown in detail in FIG. 10. Said bleeder housing 27, which may be assembled to the bleeder body portion 25a as by means of silver soldering, may incorporate an outer, centrally disposed, internally threaded main outer, passageway at 29 and an inner, 15° tapered passageway at 30, which passageway 30 communicates with the second, hydraulic oil-filled passageway 25e formed in the connector body portion 25a. *Adjustably positioned within the said main outer and inner passageways 29 and 30 of the bleeder housing 27 is the bleeder screw 28, shown in detail in FIG. 11. To accomplish its requisite debubbling of the oil column, the said bleeder screw 28 may include an inner reduced end portion at 31 which is designed to interfit with the 15° tapered passageway 30*, an intermediate-sized central portion at 32 that may be externally threaded for screw-threaded engagement with the main, outer internally threaded central passageway 29 of the bleeder housing 27, and a manually operable, handle-adjustment portion at 33. Within each of the aforesaid portions of the bleeder screw 28 may be incorporated a centrally disposed passageway 34, which passageway extends longitudinally of the bleeder screw 28 from the outer opening at 34a in the handle-adjustment portion 33 to a right-angle, inner opening portion at 34b. Thus, the bleeder screw element 20 may be adjusted within said bleeder housing 27 to move its inner portion 31 and thus the aforesaid right-angled, inner opening portion 34b thereof relative to the second passageway 25e of the connector body portion 25a to thereby provide for the aforementioned debubbling of the oil column in the cylinder bore 18 and the first and second passageways 23 and 25e respectively formed in the cylinder assembly 12 and the connector body portion 25a.

A principal feature of the present hand-grip dynamometer device 10 resides in the novel attachment means disposed between the previously mentioned upper and lower brackets 14 and 15 and the front and back grip members 11 and 13. In this connection, and with particular reference to FIGS. 5, 6 and 6a the upper and lower bracket members of the present device are indicated generally at 14 and 15 as each respectively including a flat and relatively narrow, plate-like base element at 35 and 38, each terminating in a rear end portion at 35a and 38a adapted to be uniquely and respectively attached to opposite end portions of the back grip member 13 (FIG. 7), and a pair of integral relatively narrow, spaced-apart and parallel, upright support members indicated generally at 36 and 37 (FIG. 5) and 39 and 40 (FIG. 6). Said support members 36, 37 and 39, 40 each respectively extend from a rear end portion in upraised relation from an intermediate portion of the surface of said base elements 35 and 38 to a front end portion extending in overlapping relation to, and thereby projecting outwardly of, the forward or front end of said base elements 35, 38 to each terminate in a pair of spaced-apart and parallel front grip member-supporting portions at 36a and 37a, and 39a and 40a, respectively. Said supporting portions 36a, 37a, and 39a and 40a each further incorporates slots at 36b and 37b, and 39b and 40b, respectively, which slots are uniquely utilized to interconnect the front grip member 11 to the bracket members 14 and 15 in a new and improved manner to be hereinafter described in detail. Naturally, when in their assembled condition, the above-described support members 36, 37 and 39, 40 actually extend inwardly towards each other.

The previously mentioned rear end portions 35a and 38a (FIGS. 5 and 6) of the bracket members 14 and 15 each may be made with a relatively elongated slot at 41 and 42, which slots uniquely permit the adjustment of the back grip member 13 to a range of positions at different distances away from the cylinder assembly 12 and thus provides for and enables the accommodation of human hands of various sizes in a unique and improved manner to be further described hereinafter. To this end, the said back grip member 13 is seen particularly in FIG. 7 as incorporating in each end portion thereof, indicated at 13a and 13b, an internally threaded opening at 13c and 13d, respectively. When mounted in position between the said rear end portions 35a and 38a of the upper and lower bracket members 14 and 15, as seen in FIG. 1, the aforesaid threaded openings 13c and 13d are respectively aligned with and closely adjacent to, and between the previously noted, relatively elongated slots 41 and 42 of the bracket members 14 and 15. Thereafter, a pair of clamping screws, indicated at 43 and 44 in FIG. 1, may then be adjustably positioned from the opposite sides of, and through the said slots 41 and 42, respectively within the opposite end, threaded openings 13c and 13d to thereby clamp the said back grip member 13 in a selected position of adjustment. Thus, a relatively larger or smaller hand may be easily accommodated with the above-described improved and yet simplified adjustable feature of the back grip member 13.

The front grip member 11 is likewise mountable or assembled to the present hand-grip dynamometer device 10 in the following novel manner. Said front grip member 11, which is shown in detail in FIG. 2, consists principally of a main hand-gripping, base portion 45 having a plurality of finger grooves, indicated generally at 46 as being incorporated on the front or forward side thereof, and opposite, expanded or enlarged type end portions at 11c and 11d, which end portions 11c, 11d each incorporate a unique guide slot, at 11a and 11b for a novel purpose to be hereinafter explained in detail. To assemble the front grip member 11 to the dynamometer device 10 of the present invention, the aforesaid opposite end portions 11c and 11d thereof may be initially and respectively interposed between the previously described parallel front grip portions 36a and 37a, and 39a and 40a, respectively forming the forward or front end portions of the bracket members 14 and 15 (Note FIGS. 5 and 6) as previously explained. When properly positioned in the assembled condition, the aforementioned guide slots 11a and 11b are in direct alignment with, and nearly adjacent to, the previously noted and similarly shaped slots 36b and 37b, and 39b and 40b, respectively incorporated in the front grip member supporting portions 36a, 37a, and 39a and 40 a of the bracket members 14, 15.

The aforementioned aligned slots 11a and 11b of the front grip member 11, and 36b and 37b, and 39b and 40b, respectively, of the bracket members 14 and 15 form an important part of the unique interconnecting means of the present invention for assembling opposite end portions of the said front grip member 11 to the said bracket members 14 and 15. In addition to the above-described slots, said interconnecting means further comprises a pair of uniquely operative guide block elements, indicated generally at 47 and 48 in FIG. 1 and in more detail for the element 47 in the views of FIGS. 2c, 2d, and 2e. These guide block elements 47, 48, which may be made of nylon or Teflon, may be inserted within the end portion-slots 11a and 11b, respectively, of the front grip member 11. The said guide block elements 47, 48 may also be affixed in centered relation within their respective supporting slots, as by means of screw adjustment, or other attachment means incorporated in each portion 11b, 11c of the front grip member 11, as is indicated generally at 49 and 50. Since, in the design of the invention depicted in FIG. 2e, for example, the length of each guide block element 47, 48, indicated at "A", is 1 ¼ inches, whereas the thickness of the end portions of the front grip member 11, denoted at "B" in FIG. 2b for end portion 11c, is three-fourths inch, each of said guide block elements 47, 48 have end portions that overlap the opposite openings of the slots 11a, 11b. It is these overlapping end portions of each guide block element 47, 48 which are similarly positioned within the respective pair of slots 36b and 37b, and 39b and 40b formed in the bracket members 14 and 14 and corresponding thereto.

Each of said guide block elements 47, 48 may be further made with a width, indicated at "C" in FIG. 2c for the element 47, of nine-sixteenths inch which is precisely equal to the width of the guide slots 11a and 11b, illustrated at "D" in FIG. 2a for the guide slot 11b. Since both the thickness of the said guide slot 11b is five thirty-seconds inch, indicated at "E" in the aforesaid FIG. 2a, is likewise made precisely equal to the thickness of the guide block elements 47, 48, depicted at "F" in FIG. 2d for the guide block element 47, said guide block elements 47, 48 have been specifically designed to snugly interfit with the said guide slots 11a and 11b of the front grip member 11. However, a unique feature of the present invention resides in the previously described slots 36b and 37b, and 39b and 40b, illustrated in FIGS. 5 and 6, for the bracket members 14 and 15, which have been specifically made with a ten-sixteenths inch width, as compared with the previously noted nine-sixteenths inch width of the guide block elements 47 and 48. In this improved manner, therefore, the application of a gripping force on the front grip member 11 will initially result in a slight relative movement between the said front grip member 11 and the supporting brackets 14 and 15 of approximately one-sixteenth of an inch. Thereafter, any further gripping action becomes isometric in nature during the operation of the present hand grip dynamometer device to be hereinafter further described.

When it is desired to test the strength of a particular hand, the subject preferably holds the dynamometer device 10 of the present invention in his hand in an upright position, with the transducer 17 (FIG. 1) facing in an upward direction, and with the fingers grasping the contoured front grip member 11 and the palm of his hand engaging the back grip member 13. On squeezing the front grip member 11, the applied force, of course, being reacted against the back grip member 13, the said front grip member 11 will move the previously noted slight amount relative to the bracket members 14, 15 approximately one-sixteenth of an inch, by virtue of the above-referred to, novel, limited movement-interconnecting means between the guide block members 47, 48 and the bracket member-slots 36b and 37b, and 39b and 40b corresponding thereto. This limited movement of the said front grip member 11 will, of course, correspondingly move the piston 20 which is being held in resilient contact immediately behind and in contact against the back surface of the front grip member 11 (Note FIG. 1) by the return spring 21 (Note FIG. 4). Of course, initially the dynamometer device 10 is prepared by filling the cylinder bore 18, through the filler plug element 22, and the first and second, interconnecting passages 23 and 25e (Note FIGS. 3 and 8) with a suitable hydraulic oil.

The column of oil so formed also extends into the transducer 17 (FIG. 1). As seen more clearly in the schematic view of FIG. 1a, said transducer 17, which constitutes a potentiometric pressure transducer, may incorporate a Bourdon tube at 51 which is likewise filled with the aforesaid oil column entering through the interconnecting passage, indicated generally at the arrow marked "52". Thereafter, the said oil column is debubbled by use of the combined bleeder-connector assembly 16.

As part of the testing procedure, the degree of apparent hardness or feel on the front grip member 11 may be varied from a readily discernible movement to relatively no movement where the force being applied is, for all practical purposes, isometric in nature. These degrees of hardness may be effected by varying the adjustment of the filler plug element 22 to thereby modify the built-in pressure present in the oil column. Thus, the initial pressure in the hydraulic system may be increased to a level where apparently no motion is actually felt in the front grip member 11. Of course, the aforesaid transducer 17 would be sensitive to any force applied to the said front grip member 11. Such a gripping force would be initially transmitted to the piston 20, as noted hereinbefore, which is in immediate contact with the front grip member 11 and, thereafter, the pressure developed thereby would be transitted by means of the oil column contained in the cylinder bore 18, the first and second hydraulic passages 23 and 25e and in the Bourdon tube 51. The second hydraulic passage 25e is placed in open communication with the said Bourdon tube 51 of the transducer 17 by the provision of an externally disposed pipe threaded portion, indicated at 25f in FIG. 9, on the upper end portion of the connector body portion 25a, which is in screw-threaded engagement within an internally threaded fitting provided at 17a on the body portion of the said transducer 17, as seen in FIG. 1. The free end portion 53 of the previously noted Bourdon tube 51 may, in the design thereof depicted in FIG. 1a, be positioned in engagement with a free and overlapping end of a slidewire contactor 54 that may be pivoted at the pivot 56 and, at its other end, engage with the slidewire resistance 55 of a potentiometer. Thus, the natural tendency of the Bourdon tube 51 to straighten out, on application of an increased pressure to the oil contained therewithin, will cause the said free end portion 53 thereof to move upwardly, which action simultaneously results in the movement of the free, overlapping end of the said slidewire contactor 54 to likewise move in an upward direction, or, in other words, to rotate about its pivot 56 and thus vary its contacting position with the slidewire resistance 55 in accordance therewith. The degree of rotation of the slidewire contactor 54 will, of course, depend on the gripping pressure applied to the front grip member 11. Naturally, the potentiometer circuit would accomplish the requisite force measurement by a reading on a voltmeter that has been previously calibrated to indicate the precise relation between a given voltage reading and a predetermined number of pounds of force applied to the front grip member 11.

I claim:

1. In a hand-grip dynamometer device for testing the strength of the human hand; a first, front hand-grip member having finger-engaging portions; a second, back hand-grip member supporting the palm of the hand to be tested; and a third, intermediately disposed and combined, main support-and-pressure-transmitting member retaining said front and back hand-grip members in supported position thereto and operatively associated with, and actuatable by squeezing pressure applied to said front hand-grip member; said third-named member having a first pair of rear end extension portions interconnected with, and supporting opposite end portions of said back hand-grip member in upright, rigid relation thereto, and a second pair of front end extension portions having direct support element means adapted to support opposite end portions of said front hand-grip member in semi-rigid and upright relation thereto for providing an initial limited movement thereof relative to said front end extension portions during the initial portion of a squeezing pressure applied to said front hand-grip member, and for ensuring the subsequent substantially isometric-type of operation during the latter portion of the squeezing pressure being applied; said pair of front end rear end extension portions comprising and being integrally formed with, a pair of parallel and spaced-apart bracket-support elements retaining said front and back hand-grip members and said main support-and-pressure-transmitting member in supported relation therebetween; said rear end extension portions of said pair of bracket-support elements incorporating adjustment means releasably attached to opposite end portions of, and thereby providing for the adjustment of the position of said back hand-grip member relative to its distance from said front hand-grip member to thus accommodate human hands of various sizes.

2. In a hand-grip dynamometer device as in claim 1, wherein said front, hand-grip member incorporates slotted end portions adapted to receive in overlapping and snug-fit relation therein said direct support element means, and each of said front end extension portions of said pair of bracket-support elements further incorporating slotted end portions slightly larger than, and thereby receiving the overlapping end portions of said direct support element means in slightly loose relation therewithin to thus ensure the said initial, limited movement between said front hand-grip member and said bracket-support elements during the initial squeezing pressure being applied thereto.

3. In a hand-grip dynamometer as in claim 1, wherein said combined, main support-and-pressure-transmitting member comprises a cylinder incorporating an open-ended cylinder bore adapted to be filled with a supply of hydraulic oil, a sealed piston slidably positioned in said cylinder bore and having a nose end portion extending in overlapping relation outside the front end of said bore, a return spring in engagement at one end thereof with the rear end of said piston and maintaining the said nose end portion of said piston in continual, resilient contact with the back-side of said front, hand-grip member for actuation thereby on the application of a squeezing pressure thereto, and a filler plug element closing the rear end of said bore and in engagement with the opposite end of, and thereby retaining said return spring in compressed, resilient relation to said piston.

4. In a hand-grip dynamometer device as in claim 3, and a first, hydraulic oil-filled passage in communication with said cylinder bore; a combined bleeder-connector assembly releasably attached to said cylinder and adapted to debubble the hydraulic oil column within said main support-and-pressure-transmitting member, said bleeder-connector incorporating a second, hydraulic oil-filled passage in open communication with the first, hydraulic oil-filled passage of said cylinder; and a transducer device interconnected with said bleeder-connector assembly and having a third, hydraulic oil-filled passage in open communication with the second, hydraulic oil-filled passage of said bleeder-connector assembly and thereby adapted to transform the pressure added to the hydraulic oil-column filling said passages upon actuation of the said piston by the application of a squeezing pressure to the said front hand-grip member.

5. In a hand-grip dynamometer device as in claim 4, said combined bleeder-connector assembly comprising a main, connector-body portion incorporating the said second, hydraulic oil-filled passage; and a bleeder housing portion extending transversely of said connector body portion; said bleeder housing portion having a bleeder screw element adjustably positioned therewithin and incorporating a main bleeder passage-containing portion and a handle portion.

6. In a hand-grip dynamometer device as in claim 3, said filler plug being threadedly engaged in the rear end opening of said cylinder bore for adjustment to various settings each corresponding to a predetermined degree of resistance at the said front hand-grip member.

7. In a hand-grip member as in claim 1, said combined, main support-and-pressure-transmitting member comprising an upper and a lower bracket each incorporating a rear hand-grip member-supporting bracket portion having a centrally-disposed, and relatively elongated slot disposed outwardly of, and in adjacent relation to opposite end portions of a said rear hand-grip member; and a clamping screw element for clamping said rear hand-grip member-opposite end portions by the engagement thereof through each of said slots from outside of said rear, supporting bracket portion.

8. In a hand-grip member as in claim 7, said upper and lower brackets each further incorporating a front hand-grip member-supporting bracket portion having an end portion with a slot of predetermined shape and size, and said front hand-grip member having oppositely-disposed end portions incorporating guide slots of similar shape to, but of slightly smaller size than, the said end portion-slots incorporated in said brackets; said front hand-grip member-end portions being arranged between said brackets with its guide slots substantially adjacent to, and in direct alignment with, the bracket end portion-slots, and further having a separate guide block element fixedly positioned in centered and tight-fitting relation within each of the said guide slots thereof, said guide block elements having opposite end portions extending outwardly of opposite end openings of said guide slots for engagement in slightly loose-fitting relation within the aligned pair of slots formed in said front hand-grip member-supporting bracket portions and thereby interconnecting said front hand-grip member with said upper and lower brackets with a limited, relative movement provided therebetween.

* * * * *